(12) United States Patent
Bertocchi

(10) Patent No.: US 11,304,430 B2
(45) Date of Patent: Apr. 19, 2022

(54) PROCESS AND APPARATUS FOR EXTRACTION AT ROOM TEMPERATURE OF JUICE AND PUREE FROM FOOD PRODUCTS

(71) Applicant: Alessandro Bertocchi, Parma (IT)

(72) Inventor: Alessandro Bertocchi, Parma (IT)

( * ) Notice: Subject to any disclaimer, the term of this patent is extended or adjusted under 35 U.S.C. 154(b) by 185 days.

(21) Appl. No.: 15/244,036

(22) Filed: Aug. 23, 2016

(65) Prior Publication Data

US 2016/0353790 A1 Dec. 8, 2016

Related U.S. Application Data

(63) Continuation-in-part of application No. 10/576,325, filed as application No. PCT/IB2004/003346 on Oct. 14, 2004.

(30) Foreign Application Priority Data

Oct. 21, 2003 (IT) ................ PI2003A00008

(51) Int. Cl.
*A23L 2/04* (2006.01)
*A23N 1/02* (2006.01)
*A23L 19/00* (2016.01)

(52) U.S. Cl.
CPC ............. *A23L 2/04* (2013.01); *A23L 19/09* (2016.08); *A23N 1/02* (2013.01); *A23V 2002/00* (2013.01)

(58) Field of Classification Search
CPC .. A23N 1/00; A23N 1/003; A23N 1/02; A23L 2/02; A23L 2/04; A23L 2/06
USPC ........................................................ 426/489
See application file for complete search history.

(56) References Cited

U.S. PATENT DOCUMENTS

| | | | | |
|---|---|---|---|---|
| 2,360,964 A | * | 10/1944 | Moroni | A23N 1/00 100/96 |
| 4,643,085 A | * | 2/1987 | Bertocchi | A23N 1/00 241/260 |
| 5,283,078 A | * | 2/1994 | Bertocchi | A23N 1/02 426/482 |

(Continued)

FOREIGN PATENT DOCUMENTS

FR 2147449 * 9/1973 ............... A23N 1/00

OTHER PUBLICATIONS

English translation of FR2147449 as translated by machine available through http://ep.espacenet.com (Year: 1973).*

*Primary Examiner* — Jeffrey P Mornhinweg

(74) *Attorney, Agent, or Firm* — Ladas & Parry LLP; Malcolm J. MacDonald

(57) ABSTRACT

A process for optimizing the efficiency of extraction at room temperature of juice or puree from pulps of fruit and vegetables, responsive to their consistency. The pulps are first cut and softened in a first section of the machine, where a rotor applies pulses to the pulps in quick succession against a stator having protrusions on the inner surface. The softened product then passes through an extraction section, where the separation is carried out of a main product, which is conveyed in an outlet duct, from the waste solid parts, which are discharged through an outlet. The rotors are mounted on different shafts operated by motors. Both motors are operatively connected to a device that controls the speeds manually, or automatically, responsive to predetermined input parameters, according to the consistency of the product.

3 Claims, 5 Drawing Sheets

(56) References Cited

U.S. PATENT DOCUMENTS 6,149,083 A * 11/2000 McFarland .......... B02C 18/302
241/186.5
6,550,376 B2 * 4/2003 Johnston ................ B30B 9/122
100/117

* cited by examiner

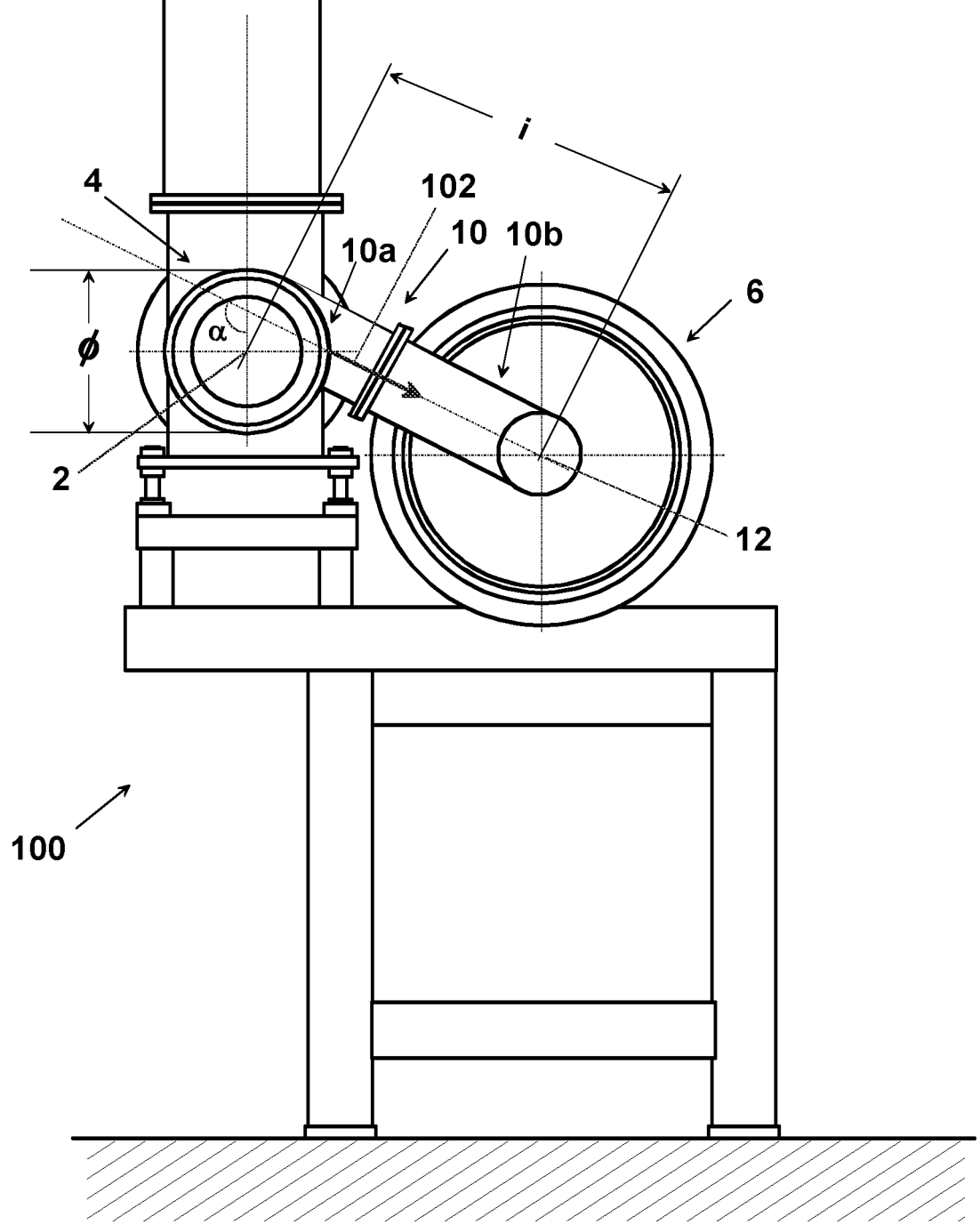

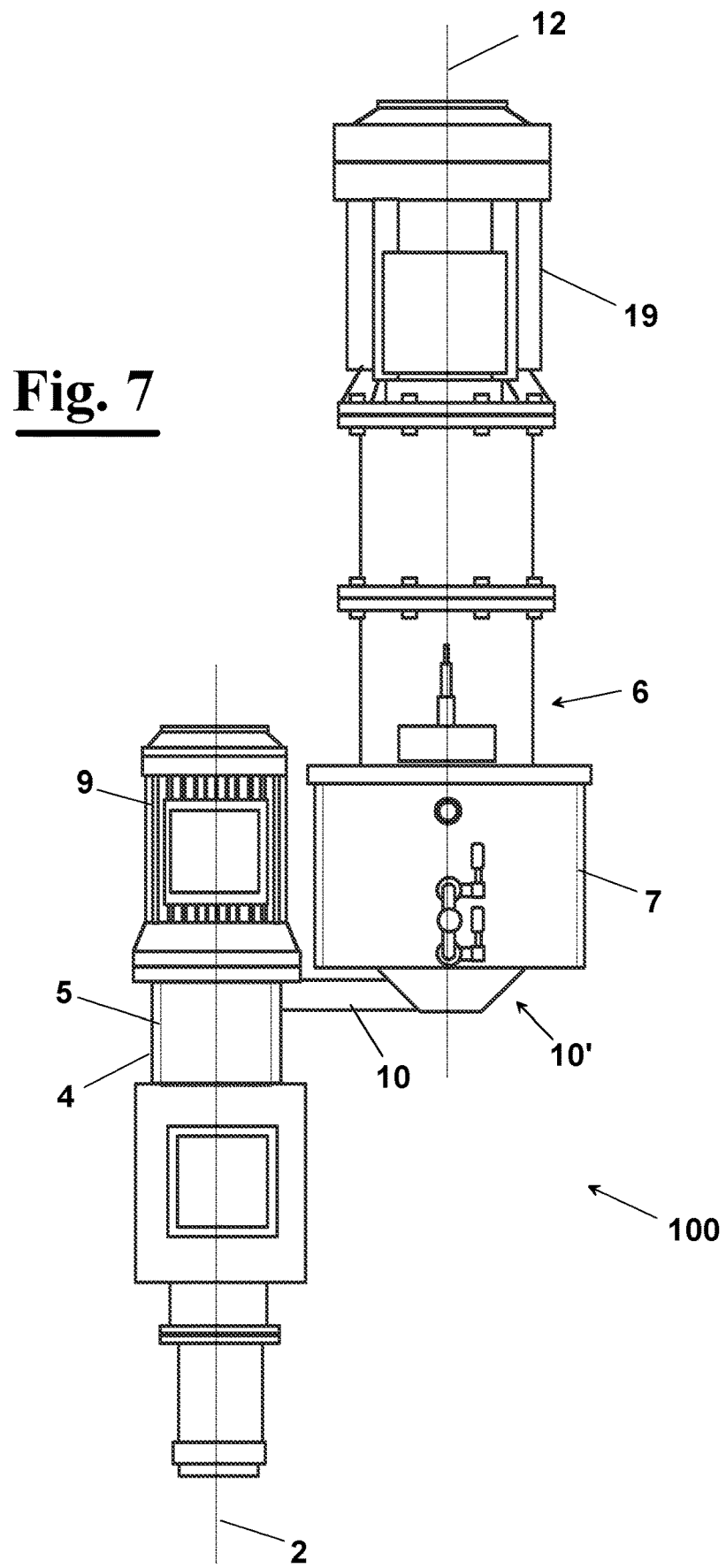

PROCESS AND APPARATUS FOR EXTRACTION AT ROOM TEMPERATURE OF JUICE AND PUREE FROM FOOD PRODUCTS

FIELD OF THE INVENTION

The present invention generally relates to machines for the food industry and specifically it relates to the extraction of juice and puree from vegetable or animal food.

In particular, the invention relates to a process for optimizing the efficiency of extraction at room temperature juice or puree from said food.

BACKGROUND OF THE INVENTION

As known, a variety exists of types of rotating machines (rough and fine extractors) for obtaining juice and puree mainly from vegetable food, fruit and vegetables, but also from animal food, meat and fish.

Normally, in a first step the product to treat is previously softened or chopped, more or less finely, for then being put in an extracting machine in a second step. The extracting machines of prior art are made up essentially of a fixed structure that comprises a perforated sheet of cylindrical or conic shape, also called screen, and a bladed rotor that rotates inside. The rotor is fitted on a shaft which rotates quickly driven by a motor. In particular, the chopped or softened product by centrifugal force is pushed radially and continuously against the screen. This way the product passes through the screen thus extracting the mostly liquid part that is conveyed for being then subject to further treatments. The solid part that do not pass through the screen, instead, is pushed axially opposite to the input and is automatically conveyed to an unloading section as waste to dispose. See on this subject IT1199392.

A known process of this kind is the extraction at room temperature that is carried out in two steps: in a first step the food pulps is softened by a plurality of pulses in quick succession and in a second step, which is carried out in an extracting apparatus as above described, the useful part (juice or puree) is separated from the waste solid part.

In room temperature extraction softening is obtained by pulses in quick succession produced by a cylindrical or conical body (stator), which has a plurality of protrusions on the inner surface, associated to a bladed rotor that turning in the stator pushes the food pulps by centrifugal force against the protrusions of the stator, giving rise to the softening. See on this subject IT1249363.

When extracting at room temperature, according to the above described prior art, the softening and extracting steps are gathered in a single compact working unit having a single motor: the respective rotors are mounted on a same axis and so rotate at a same speed. In this connection see hereinafter FIG. 1 and the relative description.

Such a unit gives good results for all those vegetables that, owing to a low consistency of their pulp (i.e. apples, peaches, pears, apricots), can be easily softened, but are less suitable for products having higher consistency (i.e. carrots, quinces, etc.) that require a stronger softening action to reach an optimal efficiency in the following extraction step.

The most effective way to boost the softening rate is to increase the speed of the respective rotor to obtain a double effect of having more pulses and at the same time to give each pulse a higher energy.

However, a higher speed of the rotor of the extracting apparatus different from the optimal can be problematic, both because the fraction of liquid and solid parts changes, and because the mechanical parts can be stressed in an incorrect way.

For this reason, the difficulty to soften certain fruit and vegetables having fibres of high consistency causes such fruit and vegetables to be scarcely used for juice or puree.

An opposite problem arises with products having a very soft pulp, for example watermelons, for which the softening step has to be very short and not much energetic, i.e. with low speed of the rotor, whereas the step of extraction can be carried out with much higher speed.

SUMMARY OF THE INVENTION

It is therefore a feature of the present invention to provide a process that is capable to optimize the efficiency of extraction at room temperature juice or puree from food pulps of fruit and vegetables, responsive to the consistency of the same, without encountering the above drawbacks.

It is another feature of the present invention to provide a machine that carries out this process.

These and other objects are accomplished by the process for optimizing the extraction at room temperature juice or puree, from food pulps of fruit and vegetables having a predetermined consistency, by a machine having:
- a softening section of the food pulps having at least a first stator and a first rotor, the first rotor rotating at a first speed:
- an extracting section having at least a second stator and a second rotor, the second rotor rotating at a second speed;
- speed adjusting means operatively connected to rotors driving means; wherein the steps are provided of
- actuating the rotors driving means by said speed adjusting means according to a predetermined ratio between the first and the second speed responsive to an input parameter relative to the consistency of the food pulps.

In a possible exemplary embodiment said speed adjusting means comprise means for receiving an input parameter through a processor, and the steps are provided of:
- communicating to the processor an input parameter relative to the consistency of the food pulps;
- actuating the rotors driving means according to a predetermined ratio between the first and the second speed responsive to the input parameter.

According to another aspect of the invention, a machine for extracting at room temperature juice or puree from food pulps of fruit and vegetables having a predetermined consistency comprises:
- a softening section of the food pulps having at least a first stator and a first rotor, the first rotor rotating at a first speed:
- an extracting section having at least a second stator and a second rotor, the second rotor rotating at a second speed,
- a first motor for causing the first rotor to rotate at the first speed,
- a second motor for causing the second rotor to rotate at the second speed,
- a device for adjusting the speed and the efficiency of the machine having speed adjusting means operatively connected to the first and the second motor, whereby it is possible to operate the rotors driving means by said speed adjusting means according to a predetermined ratio between the first and the second speed responsive to an input parameter relative to the consistency of the food pulps.

In a possible exemplary embodiment, said speed adjusting means comprise means for receiving an input parameter through a processor, and means are provided for setting in said processor an input parameter relative to the consistency of the food pulps, said rotors driving means according to a predetermined ratio between the first and the second speed responsive to the input parameter.

Alternatively, the speed adjusting means are means operated manually selected from the group: frequency variators, mechanical gearboxes.

In particular, the first and the second motor have axes shifted from each other.

BRIEF DESCRIPTION OF THE DRAWINGS

The invention will now shown with the following description of some exemplary embodiments thereof, exemplifying but not limitative, with reference to the attached drawings wherein:

FIG. 6 shows a frontal view of the rotating machine of FIG. 2;

FIG. 7 is a plan view of the rotating machine of FIG. 2.

DESCRIPTION OF A PREFERRED
EXEMPLARY EMBODIMENT

Figure 1:
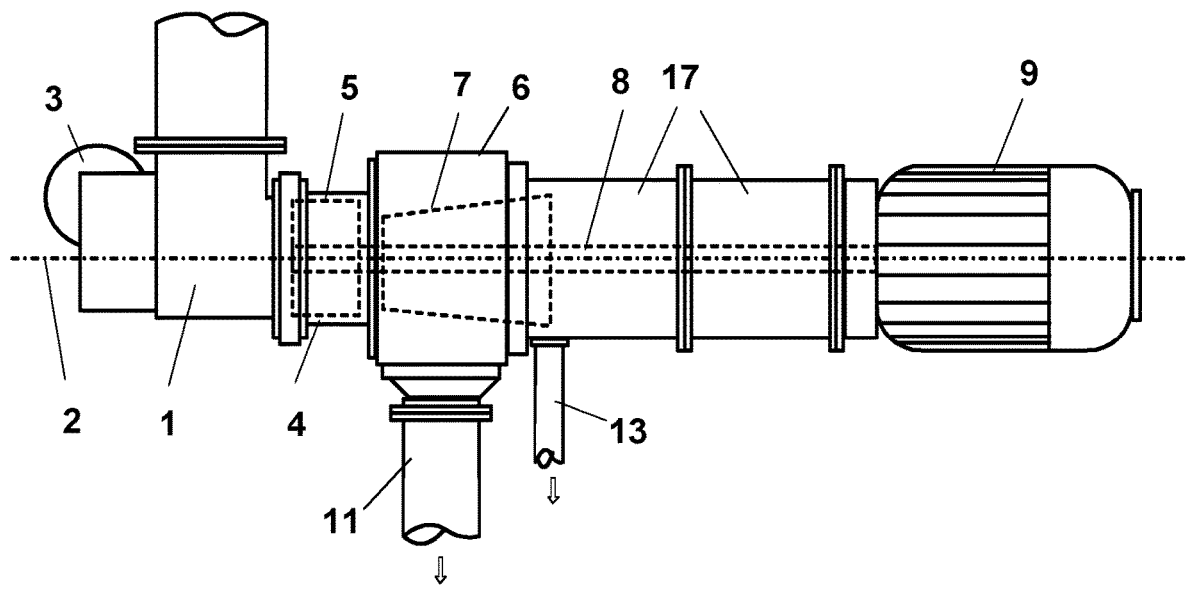
FIG. 1 shows a longitudinal cross section of a rotating machine for obtaining juice or puree from vegetable or animal food with a traditional configuration of prior art.

With reference to FIG. 1, a rotating machine of prior art for extracting at room temperature juice or puree from vegetable or animal food comprises an input duct 1 where the fruit and vegetables are fed, such as fruit or vegetables, whole or cut parts, conveyed by a feeding screw not shown, operated by a motor 3. In a first step is carried out the cut and softening the pulps, carried out in a first section of the machine, indicated as 4, not described in detail since known for example from IT1249363, where a first rotor 5 applies to the food pulps a plurality of pulses in quick succession against a stator that has protrusions on the inner surface.

If the product arrives to the first section 4 as whole fruit or large parts, co-axially and upstream from the rotor is mounted a rotating cutter comprising a plurality of knives suitable for chopping the product in smaller parts.

The softened product, exiting from first section 4, then passes through a second section 6, where a separation is carried out of the target parts of pulp (juice or puree), which are conveyed in an outlet duct 11, from the waste solid parts (peelings, seeds, hard fibres), which are disposed through an outlet 13. This second section has a second rotor 7, which engages in a stator comprising a screen substantially of equal size, as described in IT1199392.

The first and the second rotor 5 and 7 are both brought into rotation by a shaft 8 operated by a motor 9 and cantilevered by supports 17. This way, the number of turns of the two rotors 5 and 7 is the same.

Figure 2:
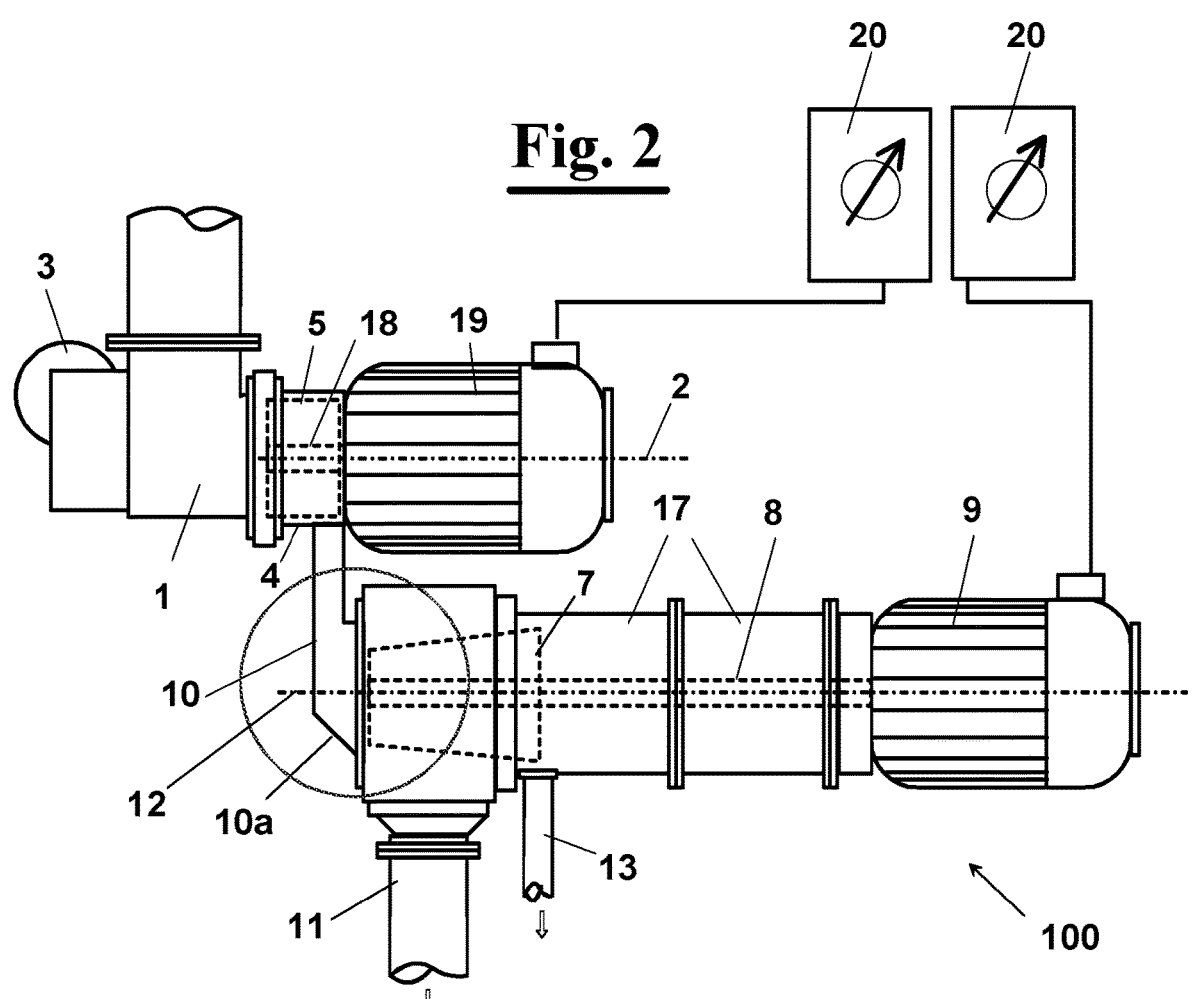
FIG. 2 shows a longitudinal cross section of a rotating machine for obtaining juice or puree in a first exemplary embodiment that carries out the process according to the invention.
Figure 3:
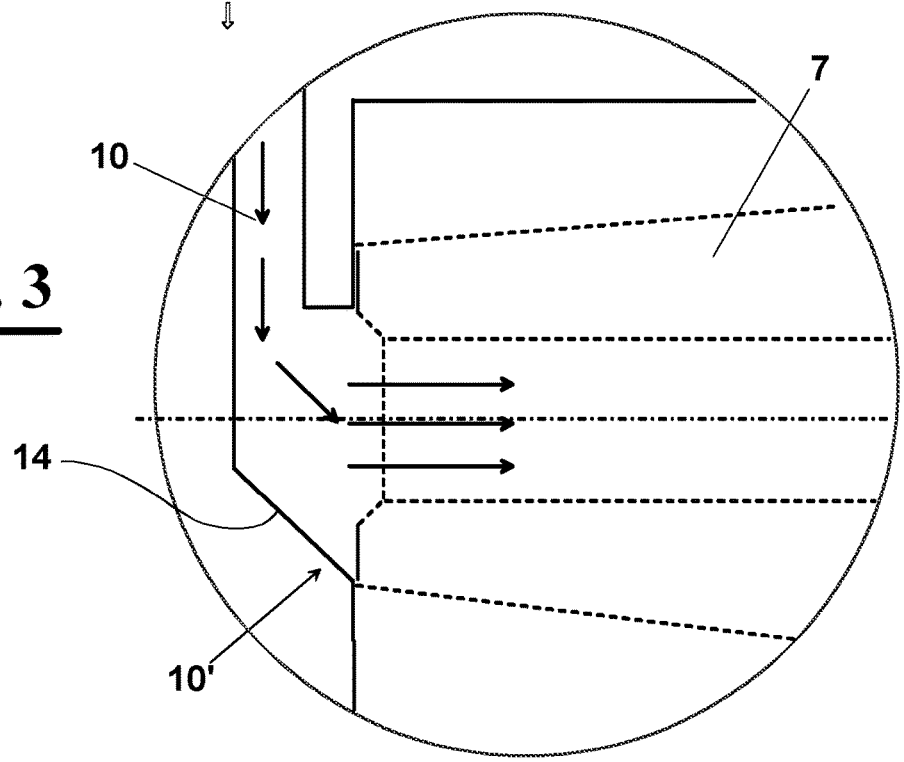
FIG. 3 is an enlarged view of the rotating machine for obtaining juice or puree of FIG. 2 in order to highlight some technical characteristics.

On the contrary, according to the present invention, rotor 5 is not mounted on the same shaft 8 of rotor 7, but on a different shaft 18 operated by a second motor 19 (see FIG. 2). Both motor 19 and motor 9 are operatively connected to a device 20 that is arranged to control the respective speed in a manual way, for example a speed variator, or automatically responsive to predetermined parameters, loaded as input according to the consistency of the product.

Preferably, each device 20 comprises a frequency variator, or a processor, associated to each motor 9 and 19, that sets the frequencies of each motor according to a function responsive to the input parameter relative to the consistency of the pulp of the fruit or the vegetables to treat. More in detail, the processor is arranged to compute the ratio between the first and the second speed according to the consistency of the food pulps. Then, the actuating of the first and the second rotor 5 and 7 is carried out by adjusting the frequencies of the first and the second rotor 5 and 7 according to the determined ratio. In this way the first speed in the softening section and the second speed in the extraction section are carried out according to said ratio the first and the second speed.

As shown for example in FIG. 2, rotor 5 is not co-axial to rotor 7. More precisely, first rotor 5 has an axis 2 different from the axis 12 of second rotor 7. This way, the softening section 4 and the extraction section 6 are not adjacent but separated and connected by a connection duct 10. This is arranged to convey the product treated in the softening section 4 to the extraction section 6 where the softened product is separated in a main product comprising puree and, or, juice and into a waste product.

This solution allows to arrange both motors 9 and 19 on the respective axes 2 and 12 downstream of the respective sections 6 and 4. The shafts 8 and 18 are arranged to rotate independently from each other. In particular, the shafts 8 and 18 are cantilevered within the respective sections, and this can cause problems of vibrations and high stresses.

According to the invention, sections 6 and 4 are connected by a connection duct 10. Preferably, at the end portion 10' close to the extraction section 6, the connection duct 10 is provided with at least an inclined surface 14. More precisely, the inclined surface 14 is arranged to assist the treated food to exit the connection duct 10 and enter section 6. This technical solution allows to provide an axial component to the product entering section 6. This is particularly important when in order to assist the treated product to enter is particularly important when the treated product is viscous.

In particular, the inclined surface 14 is arranged to increase the cross section of connection duct 10 at its end portion 10', i.e. near section 6. More in particular, the end portion 10' of connection duct 10 is a conical frustum of which the inclined surface 14 is the internal surface. In other words, connection duct 10, at the end portion 10', has a conical frustum shaped surface (see FIG. 7).

Preferably, section 4 and 6 are not arranged along a vertical direction. In particular, they are arranged laterally to each other (see FIGS. 6 and 7). In this way, it is possible to reduce the height of the machine 100 comprising the two sections 4 and 6, thus allowing to reduce the height that is necessary to place the machine 100, and to simplify the load of section 4 that is carried out from the above.

In particular, the connection duct 10 is inclined at a predetermined angle α (see FIG. 6) with respect to the vertical direction. This is possible, in particular, because of the high speed of rotation of rotor 5 that is enough both to treat, i.e. to soft, the product introduced in section 4, and to cause the softened product to exit along a tangential direction 102 (see FIG. 6) from section 4 and to feed it to section 6 along connection duct 10. More in particular, in order to produce the energy that is necessary for treating the product in section 4 and for feeding the treated product from section 4 to section 6, the speed of rotation $v_r$ of rotor 5 is very high.

More precisely, with reference to FIG. 6, if ø is the diameter of the circumference described by the blades of rotor 5 during its rotation about axis 2, and i is the distance between the axes 2 and 12, $v_r$ (expressed in rpm) is calculated according to the following equation:

$$vr \cdot \frac{\emptyset}{i} = 500 \div 2000$$

In particular, ø is the diameter of the circumference described by the blades of rotor 5 at the exit portion of the softening section.

In this way, it is possible to provide a connection duct 10 that is not vertical but that is inclined of a predetermined angle α with respect to the vertical direction.

In particular, the softened product exits the softening section 4 along a tangential direction through an outlet 16 connected to the connection duct 10 and then enters the extraction section along an axial direction.

Advantageously, the ratio between the diameter ø of the circumference described by the blades of rotor 5 during the rotation of the same about the first axis 2, and the distance i between the first axis 2 and the second axis 12 is set between 0,35 and 0,65:

$$\frac{\emptyset}{i} = 0.35 \div 0.65$$

This geometric ratio allows to optimize the machine 100 in terms of yield and encumbrance without compromising the correct working of the machine 100.

In particular, rotor 5 can be conical shaped. In this case, ø is the diameter of the greatest circumference defined by the blades of rotor 5 during their rotation about axis 2.

Figure 4:
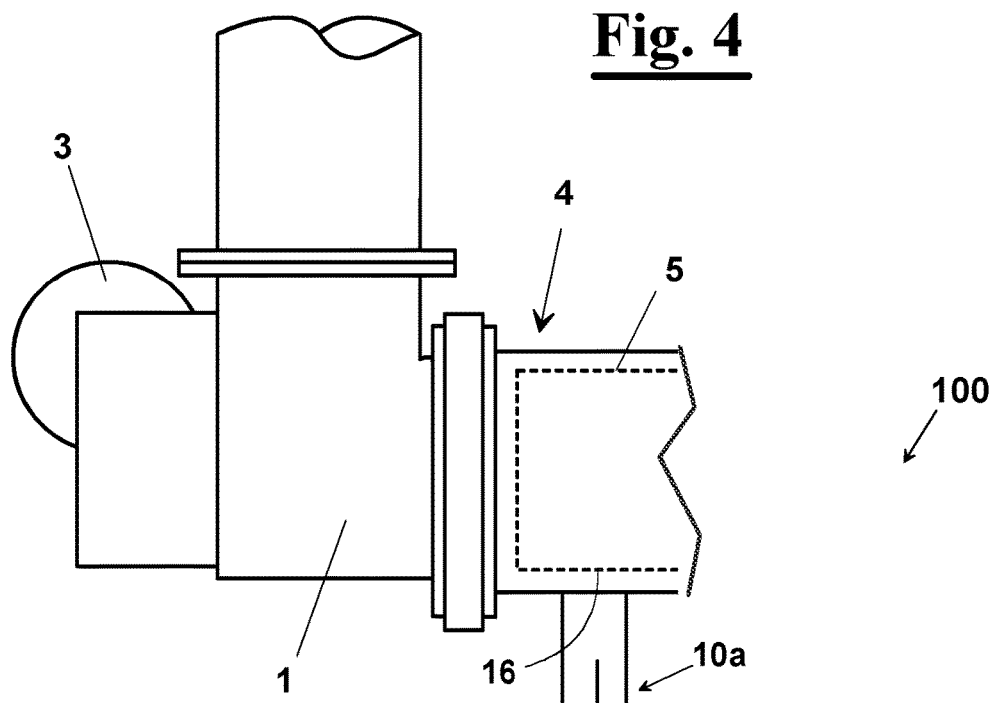
FIG. 4 shows a partial longitudinal view of a rotating machine for obtaining puree or juice according to a second embodiment of the invention.
Figure 5:
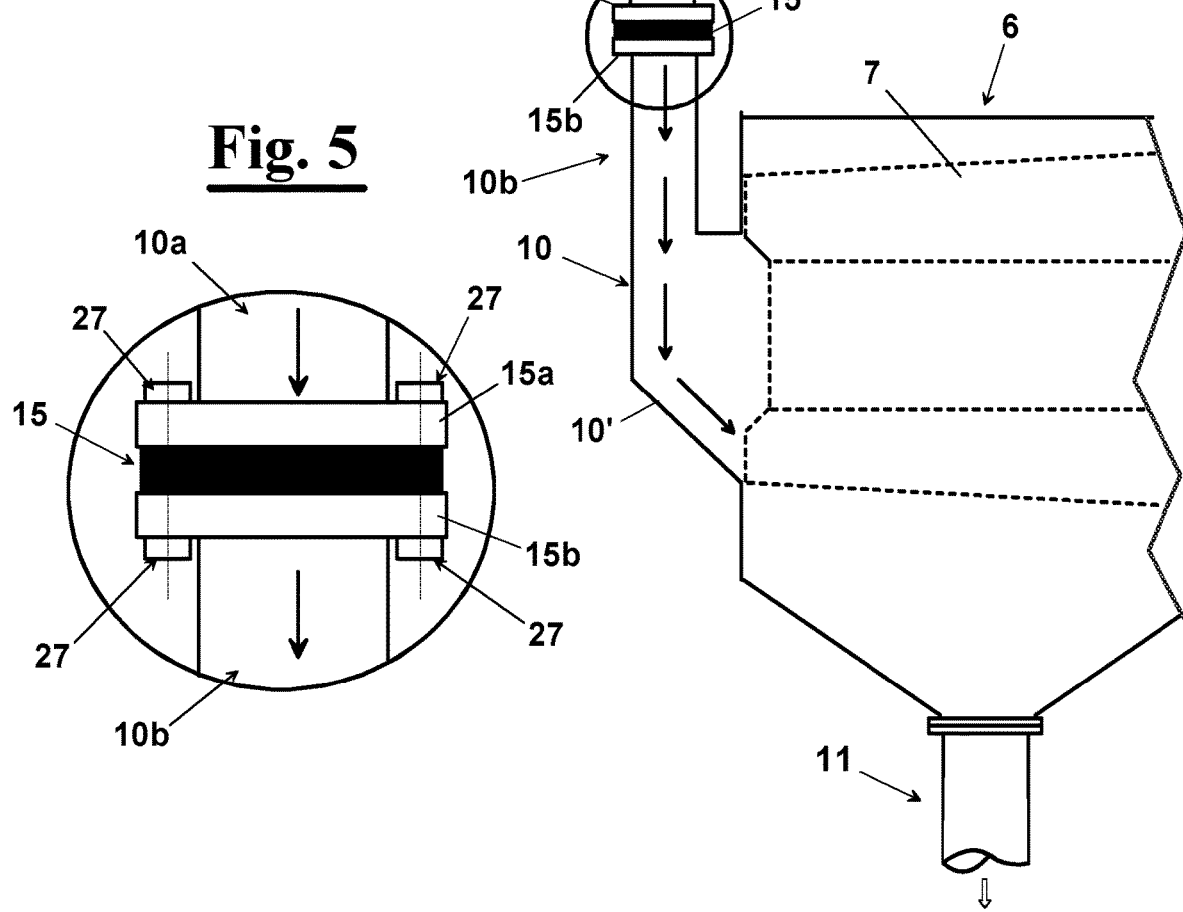
FIG. 5 is an enlarged view of a part of the rotating machine for obtaining juice or puree of FIG. 4.

According to another aspect of the invention that is shown in detail in FIGS. 4 and 5, connection duct 10 comprises at least a first connection portion 10a and a second connection portion 10b. More in detail, between first and second connection portions 10a and 10b, a resilient member 15 is provided. The resilient member 15 allows, in particular, to reduce the vibrations during the working conditions of machine 100. The connection portions 10a and 10b are preferably provided with respective flange portions 15a and 15b screwed by bolts 27. The resilient member 15 is interposed between the flange portions 15a and 15b.

A processor is provided arranged to receive an input parameter related to the consistency of the food product to be treated. Depending on the consistency of the food product to be treated a different ratio is set between the speed of rotor 5, i.e. the softening speed, and the speed of rotor 7, i.e. the extraction speed.

This is done because certain types of fruit admit strong softening and require light extraction, other require light softening and strong extraction, other strong softening and strong extraction and still other require light softening and light extraction.

In this way, the machine 100 according to the invention is suitable for treating a great number of different food products without compromising the desired organoleptic properties of the final product.

In the prior art machines this is not possible because, as shown for example in FIG. 1, the two rotors are mounted on a same shaft and therefore they rotate at the same speed.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

What is claimed is:

1. A process for extracting, at room temperature, juice or puree from a food product, the process comprising the steps of:

providing the food product having a predetermined consistency;

providing an input parameter related to the consistency of the food product;

providing a machine consisting of:

a softening section of the food product having a first stator and a first rotor provided with a plurality of blades, said first rotor having a first axis and being arranged to rotate at a first speed driven by a first rotor drive means consisting of a first shaft on which the first rotor is mounted and a first motor operating the first shaft, said softening section producing a softened product;

an extraction section arranged downstream of the softening section, and having a second stator and a second rotor, the second rotor having a second axis and arranged to rotate at a second speed driven by a second rotor drive means consisting of a second shaft on which the second rotor is mounted and a second motor operating the second shaft, the first and the second speed being operated independently from each other;

wherein the outlet of the softening section and the inlet of the extraction section are connected to each other by a connection duct;

wherein the connection duct consists of a first connection portion and a second connection portion connected to each other at respective flange portions screwed by bolts, and wherein a resilient member is provided between the flange portions;

wherein the connection duct is internally provided with an inclined surface at an end portion of the connection duct close to the extraction section for providing an axial component to the softened product entering the extraction section, thereby assisting the feeding step of the softened product, which includes a solid or viscous softened product, into the extraction section;

wherein the machine is provided with a speed adjusting means operatively connected to the first rotor drive means and to the second rotor drive means, the speed adjusting means comprising a processor;

wherein the process further comprises the steps of:

entering, in the processor, the input parameter related to the consistency of the food product to be processed;

computing, by the processor, a ratio between the first speed and the second speed, on the basis of the input parameter;

entering, in the softening section, the food product;

actuating the first and the second rotor drive means by the speed adjusting means according to the ratio between the first and the second speed computed by the processor, wherein the actuating step causes the first shaft to rotate independently from the rotation of the second shaft;

softening the food product by the first rotor rotating at the first speed in the softening section, and conveying all the softened food product in the extraction section through an outlet;

discharging the softened product tangentially from the softening section through the outlet;

feeding, by the inclined connection duct, the softened product downwards from the softening section to the inlet of the extraction section, the feeding of the softened product being carried out axially to the extraction section;

extracting juice or puree from the softened food product by the second rotor rotating at the second speed in the extraction section, and separating extracted juice or puree from waste material;

wherein the softening section and the extraction section are positioned laterally to each other and the connection duct is inclined at a predetermined angle with respect to the vertical direction; and wherein a setting step is provided for setting the speed of rotation vr of the first rotor, expressed in rpm according to the following equation:

$$vr \cdot \frac{\phi}{i} = 500 \div 2000$$

wherein ø is the diameter of the circumference described by the blades of the first rotor during rotation about the first axis, and i is the distance between the first axis and the second axis.

2. The process according to claim 1, wherein said actuating is carried out by adjusting the frequencies of the first and the second rotor according to said ratio in such a way that the first speed in the softening section and the second speed in the extraction section are carried out according to said ratio between the first and the second speed.

3. The process according to claim 1, wherein the end portion of the connection duct has a frustoconical-shaped surface.

* * * * *